Patented Feb. 27, 1951

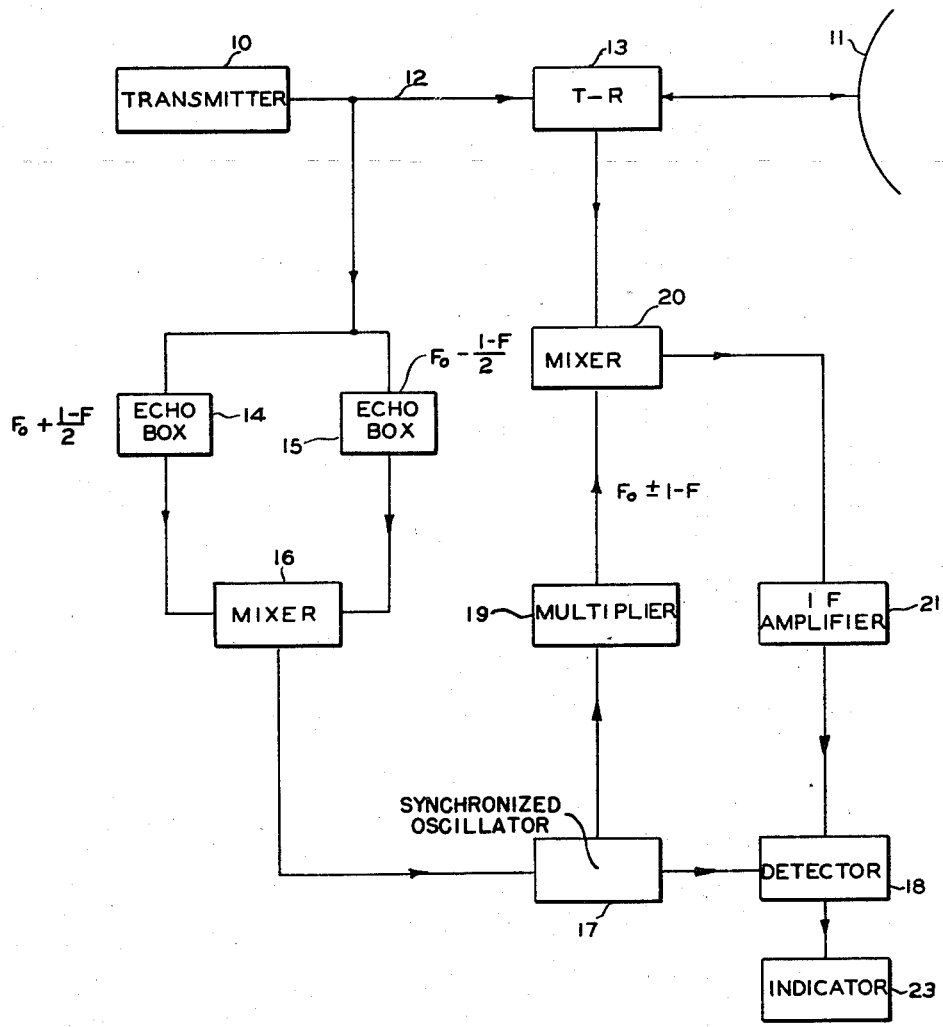

2,543,448

UNITED STATES PATENT OFFICE 2,543,448

MOVING OBJECT RADIO PULSE-ECHO SYSTEM

Alfred G. Emslie, Boston, Mass., assignor, by mesne assignments, to the United States of America as represented by the Secretary of War Application May 17, 1945, Serial No. 594,262

3 Claims. (Cl. 343—8)

The present invention relates to radio object-locating systems adapted to distinguish fixed objects from moving objects, and it relates more particularly to a coherent pulse-echo system wherein an intermediate-frequency synchronizing pulse is obtained without the use of a local oscillator.

A coherent pulse-echo system is a radio object-locating system characterized by continuous wave or interrupted continuous wave reference oscillations (sometimes hereinafter called a timing wave), synchronized in fixed phase relation (in coherence) to the usual transmitted exploratory pulses. By algebraically combining the reference oscillations and the echo-pulses returned from a reflecting object, and detecting the envelope of the resulting combination, video pulses may be obtained which provide velocity information. The object-returned echo-pulses, when added to the reference oscillations, will reinforce or oppose said reference oscillations, the reinforcing or opposing action, depending upon the phase relation between the two.

Succeeding echo-pulses returning from a fixed object will always have the same phase relation with respect to the reference oscillations, and when combined with said reference oscillations will provide constant-amplitude video pulses. On the other hand, succeeding echo-pulses from moving objects will have a progressive phase shift with respect to the timing wave, and when combined therewith, will provide video pulses having a cyclical variation in amplitude. The presentation of these video pulses, by either visual or aural means, will provide a method whereby fixed objects can be readily distinguished from moving objects, and, in the case of the latter, will indicate the object velocity relative to the exploratory pulse transmitter.

If desired, object-returned echo-pulses may be combined directly with a timing wave whose frequency is substantially equal to the carrier-frequency of the exploratory pulses. The term carrier-frequency of a pulse as here used refers to the center frequency of the band of frequencies contained in a pulse. In general, however, better results are obtained if the timing wave and echo-pulses are combined at an intermediate-frequency (called intermediate-frequency coherence). A more detailed explanation of a coherent pulse-echo system employing intermediate frequency coherence is described in a co-pending application of Robert H. Dicke, Serial No. 590,052, filed April 24, 1945.

Hereinafter the portion of each exploratory pulse used for synchronizing (or locking) the reference oscillator will be referred to as the synchronizing (or locking) pulse. If the reference oscillations are at an intermediate-frequency, it is desirable to reduce the carrier-frequency of the synchronizing pulse to substantially said intermediate-frequency before applying said synchronizing pulse to the reference oscillator circuit. As a result, prior systems utilizing intermediate-frequency coherence have heretofore required the use of a relatively high-frequency local oscillator.

It is an object of the present invention to provide an improved coherent pulse-echo system wherein a synchronizing pulse having an intermediate-frequency carrier wave is obtained in a simple and reliable manner, and without the use of a local oscillator for this purpose.

It is another object of the present invention to provide an improved coherent pulse-echo system employing intermediate-frequency coherence wherein resonant cavities are utilized to provide a synchronizing pulse having an intermediate-frequency carrier wave.

The above and other objects and advantages will appear more fully in the following description, taken with the accompanying drawing wherein the single figure shows a schematic diagram, in block diagram form, of one specific embodiment of the invention.

Referring now to the drawing, a transmitter 10, which may be a magnetron or other suitable ultra-high frequency generator is adapted to provide short duration, high carrier-frequency, pulses of radiant energy. Pulse transmission to a directional antenna 11 may be achieved by suitable transmission line 12, together with a customary transmit-receive switch 13.

Transmit-receive switch 13 functions to connect transmitter 10 to antenna 11 during transmission of exploratory pulses and to disconnect the rest of the circuit shown. During the interim between pulses, the switch functions to disconnect antenna 11 from transmitter 10 and to connect antenna 11 to the receiver channel presently to be described.

A portion of the transmitted exploratory pulses is applied simultaneously to echo-boxes 14 and 15. The respective echo-boxes are tuned resonant cavities, having a high Q characteristic, that, when excited by radiant energy containing frequencies equal to the resonant frequencies of the cavities, will each transmit or pass a pulse having a very narrow frequency spectrum.

Echo-box 14 and echo-box 15 are tuned so that the difference between their resonant frequencies is equal to the intermediate-frequency (I.-F.) utilized throughout the present system. In other words, if the carrier-frequency of the exploratory pulses is equal to $F_0$, echo-box 14 may be tuned to resonate at a frequency $$F_0 + \frac{I.\text{-}F.}{2}$$

and echo-box 15 may be tuned to resonate at a frequency of $$F_0 - \frac{I.\text{-}F.}{2}$$

The pulses issuing from said echo-boxes will then consist of pulses having their carrier-waves at these respective frequencies. Inasmuch as the echo-boxes are excited by the side bands of the exploratory pulses, the operation of such a system is facilitated by the use of very short duration exploratory pulses which provide the necessary energy in the frequency side bands.

The pulse outputs from echo-boxes 14 and 15 respectively are applied to mixer 16, the output circuit of which is tuned to a frequency equal to the difference of the two input frequencies (the I.-F. frequency). The output pulse from mixer 16, hereinafter referred to as the synchronizing (or locking) pulse, is applied to coherent oscillator 17. The coherent oscillator 17 is an intermediate-frequency oscillator, the output of which is locked in fixed phase relation with respect to the exploratory pulses through the medium of the applied synchronizing pulses.

Oscillator 17 has two outputs, one of which is applied as a timing wave to detector 18, the second output being applied to frequency multiplier 19. The character and function of frequency multiplier 19 is more fully described in a copending application of Alfred G. Emslie, Serial No. 594,263, filed May 17, 1945. Briefly, frequency multiplier 19 acts to provide stable oscillations whose frequency is substantially equal to the exploratory pulse carrier-frequency, plus or minus the intermediate-frequency $$F_0 \pm I.\text{-}F.$$

the choice of plus or minus being arbitrary.

Object-returned echo-pulses (having a carrier-frequency $F_0$) received by antenna 11 are fed through transmit-receive switch 13 to mixer 20, a second input to mixer 20 comprising the stable oscillations from frequency multiplier 19. The output circuit of mixer 20 is tuned to the difference of the two input frequencies. Issuing from mixer 20, therefore, are object-returned echo-pulses having an intermediate-frequency carrier-wave. These object-returned echo-pulses may then be applied to intermediate-frequency amplifier 21, the amplified pulse output therefrom being applied as a second input to detector 18.

In detector 18 the reference oscillations from oscillator 17 and the echo-pulses from intermediate-frequency amplifier 21 are algebraically combined, and the envelope of the resulting combination obtained, to produce video pulses.

Fixed objects will be manifested by constant amplitude video pulses, as mentioned above, whereas moving objects will be manifested by video pulses having a cyclical variation in amplitude. Video pulses from detector 18 may be utilized by an aural or visual indicator such as indicator 23 to readily distinguish fixed objects from moving objects, and to provide velocity information in the instance of the latter. The nature of the velocity information contained in the video pulse and one possible indicator is described in the above-mentioned copending application of Robert H. Dicke, Serial No. 590,052, filed April 24, 1945, issued as Patent No. 2,535,274 on December 26, 1950.

While there has been described one embodiment of the present invention it will be manifest to those skilled in the art that various changes and modifications may be made therein without departing from the invention and it is therefore aimed in the appended claims to cover all such changes and modifications as fall within the spirit and scope of the invention.

I claim:

1. A radio object-location system, including means for generating and transmitting short duration, high carrier-frequency exploratory pulses of radiant energy, two resonant cavities tuned to different resonant frequencies, means for simultaneously applying to said resonant cavities a portion of each of said exploratory pulses, the output from each of said resonant cavities comprising a pulse having a carrier wave whose frequency is substantially equal to the resonant frequency of its associated cavity, a mixer, and means for applying as inputs to said mixer the output pulses from said resonant cavities, means for obtaining as an output from said mixer a synchronizing pulse whose carrier-frequency is equal to the difference of the carrier-frequencies of the input pulses thereto, an oscillator whose frequency of oscillations is substantially equal to the carrier-frequency of said synchronizing pulse, means for synchronizing said oscillator with said synchronizing pulse, means for receiving object-returned echo-pulses, means including a frequency multiplier for reducing the carrier-frequency of the object-returned echo-pulses to a frequency substantially equal to the frequency of the oscillator output, means for combining the oscillator output and the reduced carrier-frequency object-returned echo-pulses to obtain a voltage, means for detecting the envelope of said voltage to obtain video pulses whereby the character of said video pulses provides object velocity information.

2. A radio object-location system including means for generating and transmitting short duration, high carrier-frequency exploratory pulses of radiant energy, a reference oscillator providing an oscillatory voltage output, a plurality of resonant cavities and means for applying thereto a portion of said exploratory pulses, means for obtaining from said resonant cavities a synchronizing pulse whose carrier-frequency is substantially equal to the frequency of the output from said reference oscillator, means for synchronizing said reference oscillator with the synchronizing pulse, means for receiving object-returned echo-pulses, means for reducing the carrier-frequency of the object-returned echo-pulses to a frequency substantially equal to that of said reference oscillator, means for combining the output of said reference oscillator and the reduced carrier-frequency echo-pulses to obtain an oscillatory voltage, means for detecting the envelope of said oscillatory voltage to obtain video pulses, the character of said video pulses providing object velocity information.

3. A radio object-location system including means for generating and transmitting short duration, high carrier-frequency exploratory pulses of radiant energy, a reference oscillator providing an oscillatory voltage output, a plurality of resonant cavities and means for applying thereto a portion of said exploratory pulses, means for obtaining from said resonant cavities a synchronizing pulse whose carrier-frequency is substantially equal to the frequency of the output from said reference oscillator, means for synchronizing said reference oscillator with the synchronizing pulse, means for receiving object-returned echo-pulses, means for combining the output of said reference oscillator and the received echo-pulses to obtain an oscillatory voltage, means for detecting the envelope of said oscillatory voltage to obtain video pulses, the character of said video pulses providing object velocity information.

ALFRED G. EMSLIE.

REFERENCES CITED

The following references are of record in the file of this patent:

UNITED STATES PATENTS

| Number | Name | Date |
| --- | --- | --- |
| 1,750,668 | Green | Mar. 18, 1930 |
| 1,945,952 | Nicolson | Feb. 6, 1934 |
| 2,223,224 | Newhouse | Nov. 26, 1940 |
| 2,253,589 | Southworth | Aug. 26, 1941 |
| 2,268,587 | Guanella | Jan. 6, 1942 |